(12) United States Patent
Amin et al.

(10) Patent No.: US 6,630,883 B1
(45) Date of Patent: *Oct. 7, 2003

(54) METHOD AND SYSTEM FOR DELIVERING A SHORT-MESSAGE NOTIFICATION

(75) Inventors: Umesh J. Amin; Michael Buhrmann, both of Redmond, WA (US)

(73) Assignee: AT&T Wireless Services, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,447

(22) Filed: Dec. 2, 1997

(51) Int. Cl.$^7$ .............................................. H04Q 7/14
(52) U.S. Cl. ..................... 340/7.29; 370/338; 455/413; 455/466
(58) Field of Search ................. 340/825.44, 311.1, 340/325.47, 825.52, 825.69, 825.72; 379/100.01, 100.08, 67.1, 88.23, 88.25, 88.11, 88.12, 88.13, 88.15; 455/426, 38.4, 140, 526, 517, 575, 38.1, 507, 500, 39, 556, 461, 433; 370/310, 312, 313; 358/402

(56) References Cited

U.S. PATENT DOCUMENTS

| 4,277,649 | A |   | 7/1981 | Sheinbein | 179/18 |
| 4,995,075 | A |   | 2/1991 | Angiolillo-Bent et al. | 379/142 |
| 5,177,780 | A |   | 1/1993 | Kasper et al. | |
| 5,353,329 | A | * | 10/1994 | Hayashi | 455/556 |
| 5,386,460 | A |   | 1/1995 | Boakes et al. | 379/96 |
| 5,398,021 | A | * | 3/1995 | Moore | 340/825.44 X |
| 5,418,835 | A | * | 5/1995 | Frohman et al. | 455/413 |
| 5,434,907 | A |   | 7/1995 | Goto | |
| 5,461,488 | A | * | 10/1995 | Witek | 358/402 |
| 5,479,408 | A | * | 12/1995 | Will | 370/313 |
| 5,487,100 | A | * | 1/1996 | Kane | 340/311.1 |
| 5,635,918 | A | * | 6/1997 | Tett | 340/825.52 |
| 5,706,211 | A | * | 1/1998 | Beletic et al. | 340/311.1 X |
| 5,742,905 | A | * | 4/1998 | Pepe | 455/461 |
| 5,745,851 | A | * | 4/1998 | Goto | 455/432 |
| 5,745,852 | A | * | 4/1998 | Khan | 455/433 |
| 5,933,478 | A |   | 8/1999 | Ozaki | 379/93.24 |
| 5,949,775 | A | * | 9/1999 | Rautiola | 370/338 |
| 6,006,087 | A | * | 12/1999 | Amin | 455/413 |
| 6,014,559 | A | * | 1/2000 | Amin | 455/413 |

FOREIGN PATENT DOCUMENTS

| CA | 2069003 | 5/1991 |
| GB | 2297462 A | 7/1996 |

* cited by examiner

Primary Examiner—Edwin C. Holloway, III
(74) Attorney, Agent, or Firm—Ipsolon LLP

(57) ABSTRACT

The invention provides a method and system to provide message notification to a subscriber having a wireless device, without the need to forward the message content with the notification. The message notification can be received within a wireless communication network such as a cellular telephone network. This message notification is forwarded to the wireless device of the subscriber and indicates that the subscriber has a waiting message. In another aspect of the invention, a message notification can be forwarded to a wireless device by receiving within a wireless communication network a message notification from a private base station that is connected into a premises based local area network. The premises based local area network receives the message from a message provider and stores it within a premises based to personal computer which generates the message notification. Messages may be any form of stored or recorded message, including e-mail, voicemail and facsimile.

30 Claims, 9 Drawing Sheets

METHOD AND SYSTEM FOR DELIVERING A SHORT-MESSAGE NOTIFICATION

FIELD OF THE INVENTION

This invention relates to forwarding a message notification to a subscriber through a wireless communication network to indicate a waiting message, and for forwarding a message notification using a private base station.

BACKGROUND OF THE INVENTION

When a recorded message is left for an individual, having an e-mail address, voice-mail box, facsimile or any other form of communication where a message is recorded or stored for later delivery, the intended recipient of the message must access the system where the message is recorded to receive the message. Recorded communication forms include voice-mail and message services like an on-line service such as Compuserve, America On-Line or Prodigy. With a recorded message system, the intended recipient has no way of knowing if a message is waiting without periodically accessing the system. This may require logging on to a computer and retrieving an e-mail from the subscriber mailbox or dialing in to a voice-mail system. When a recipient is not already on-line, this is an annoyance because it takes time and is frustrating to access a voice-mail system or log onto a computer from a remote location just to determine if there are any messages stored within for the subscriber.

This problem often results in customer dissatisfaction with the message service provider.

SUMMARY OF THE INVENTION

In accordance with this present invention, a subscriber with any number of message storage accounts can have a message notification delivered to their wireless communication device indicating that a message is stored and available for retrieval. A message notification is received within a wireless communication network from a message storage provider. The message notification indicates that a message is waiting for a subscriber, such as e-mail and voice-mail stored within a subscriber mailbox, or a facsimile stored in a memory. The subscriber typically registers the wireless device with the wireless communication network before a message notification can be forwarded to the wireless device.

In one aspect of the present invention, the wireless communication network is a cellular telephone network. A message notification is received within a messaging center, which forwards the message notification through a mobile switching center to a wireless device of the subscriber to indicate to the subscriber that a message is waiting for the subscriber. This message notification also can be stored within the wireless communication system to facilitate retrieval of the message if the subscriber cannot be reached on the first attempt. The home location register also can be queried to determine the location of the subscriber.

Additionally, for messages with associated alphanumeric characters, the wireless device includes an LCD or similar display for displaying the origin and address of the message.

A private base station can be part of a premises based local area network and can receive a message notification from a personal computer also connected into the local area network. In accordance with one aspect of the present invention, a premises based local area network includes in communication therewith a personal computer to which messages are delivered from the message provider.

For e-mail messaging systems, a network interface unit interfaces with the telephone network and receives e-mail messages from the network for delivery over the local area network to the personal computer. The private base station receives the e-mail notification from the personal computer over the local area network and transmits the e-mail notification to the mobile device either directly or through the wireless communications network such as a cellular telephone network. Typically, when a subscriber is registered with the private base station, the e-mail notification is received and the subscriber then knows it should log into the personal computer on the local area network and retrieve the e-mail message. Also, in some designs the e-mail notification can be received through a digital control channel.

For voice messaging systems, an interface unit interfaces with the telephone network and receives voice-mail messages from the network for delivery over the local area network to the telephone. A voice message notification is received within a messaging center, which forwards the voice message notification through a mobile switching center to a wireless device of the subscriber to indicate to the subscriber that a voice message is waiting for the subscriber. This voice message notification also can be stored within the wireless communication system to facilitate retrieval of the voice message if the subscriber cannot be reached on the first attempt. The home location register of the subscriber also can be queried to determine the location of the subscriber.

BRIEF DESCRIPTION OF THE DRAWINGS

This invention and its mode of operation will be more clearly understood from the following detailed description when read with the appended drawings in which.

Throughout the drawings, the same element when shown in more that one FIG. is designated by the same reference numeral.

DETAILED DESCRIPTION

Figure 1:
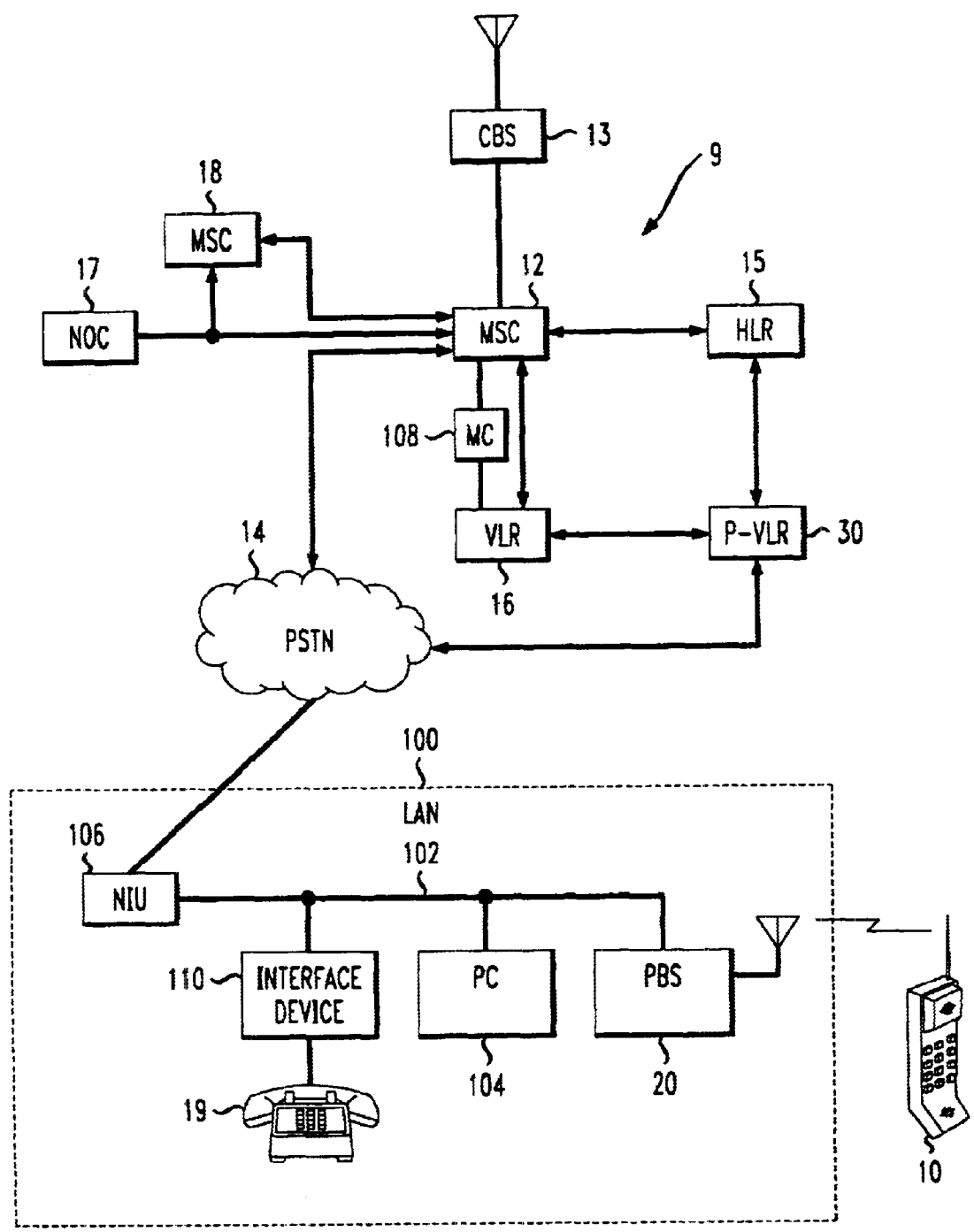
FIG. 1 shows a simplified block diagram of a cellular switching system, its logical entities as well as the relative connection with the public switched telephone network, a private base station contained in a residential premises, and connected to a local area network and a personal computer for receiving the e-mail messages from an e-mail provider.

Referring now to FIG. 1, there is shown a simplified block diagram of a cellular switching system forming part of a wireless cellular phone network illustrated generally at 9, its logical entities as well as the relative connection with the public switched telephone network 14 and a private base station 20, and a premises 100 having a local area network 102 with the private base station (PBS) 20, a personal computer (PC) 104 and network interface unit (NIU) 106 for interfacing with a telecommunications network such as the pubic switched telephone network and receiving e-mail messages. The cellular concept is well known and is described in general in the Bell System Technical Journal, Volume 58, Number 1, January 1979, and specifically in an article entitled The Cellular Concept by V. H. MacDonald, on pages 15 through 41 of this journal, the disclosure which is hereby incorporated by reference.

Included within the cellular switching system are mobile stations (MS) 10, mobile switching center (MSC) 12, the public telephone switched network (PSTN) 14, a cellular base station (CBS) 13, a home location register HLR) 15, a visiting location register (VLR) 16, a private base station visiting location register (P-VLR) 30, and a private base station (PBS) 20, which is part of the premises based local area network 102. A subscriber station telephone set 19 is illustratively shown connected to the public telephone switched network 14 through the LAN 102 via an interface device 110. In this particular example, the private base station is illustrated as part of a residential premises 100, shown with the dotted lines. A mobile station 10 is shown contained in the residential premises. The cellular switching system also includes a messaging center (MC) 108.

For clarity, mobile switching center 12 is illustratively shown connected to mobile switching center 18 and network operation controller (NOC) 17. The mobile switching center 18 is part of the overall cellular systems operation and may similarly have a home location register, a visiting location register, a P-VLR, as well as multiple cellular base stations associated therewith. It is understood that other mobile switching centers also may be part of the cellular system. The network operation controller provides overall control and thereby ensures that the operation of the whole cellular system is supported and serviced.

The mobile station 10 and base station 20 are designed to operate in a cellular system in accordance with the Telecommunications Industry Association (TIA) Interim Standard (IS)-136, dated December 1994. The mobile station 10 is illustrated as a cellular telephone. However, the invention is not restricted to the use of cellular telephones. Other wireless services such as cordless telephones or wireless pagers could be used.

The mobile switching center 12 performs all the switching functions related to call delivery and is interconnected to the public telephone switched network 14, the home location register 15, the visiting location register 16 and the cellular base station 13.

The home location register 15 maintains a data base, profile record and call routing information or a pointer to the call routing information for all mobile stations in a particular assigned home area. The visiting location register 16 maintains a data base for call routing information or a pointer to the call routing information for those mobile stations which are visiting its assigned area of coverage.

The private base station visiting location register 30 performs the interface functions between a private base station, such as station 20, and both the home location register 15 and the visiting location register 16 for holding both call routing information and, order or registered position information for the mobile stations that are currently registered with the private base station. The private base station visiting location register 30 is also responsible for administering spectrum utilization and operations of the private base station 20.

The functions for the private base station visiting location register 30 may be conveniently summarized as follows:

1. Authorize new private base station operation.

2. Download private base station operating parameters and performs operation administration.

3. Authenticate all calls received from private base station.

4. Perform Registration Notification task to HLR/VLR when network update is received from private base station.

5. Perform mobile station inactive task to HLR/VLR when network cancellation is received from private base station.

The private base station 20 qualifies for private (or non-public) mode time-division-multiple-access (TDMA) cellular operation under IS-136 cellular radio interface, which permits a cellular mobile station to register with a private base station to receive or originate calls through a land-line connected to the public telephone switched network instead of through a cellular base station, such as cellular base station 13, connected in the regular public cellular system. Specifically, this radio interface provides the digital control channel in accordance with TIA-IS-136.1 and the traffic channels and control channel in accordance with TIA IS-136.2 for communication with the mobile station. The private base station can support the registering of multiple mobile stations, e.g., cellular telephones. A modem interface between the private base station and the private base station visiting location register also is supported by the radio interface.

Figure 2:
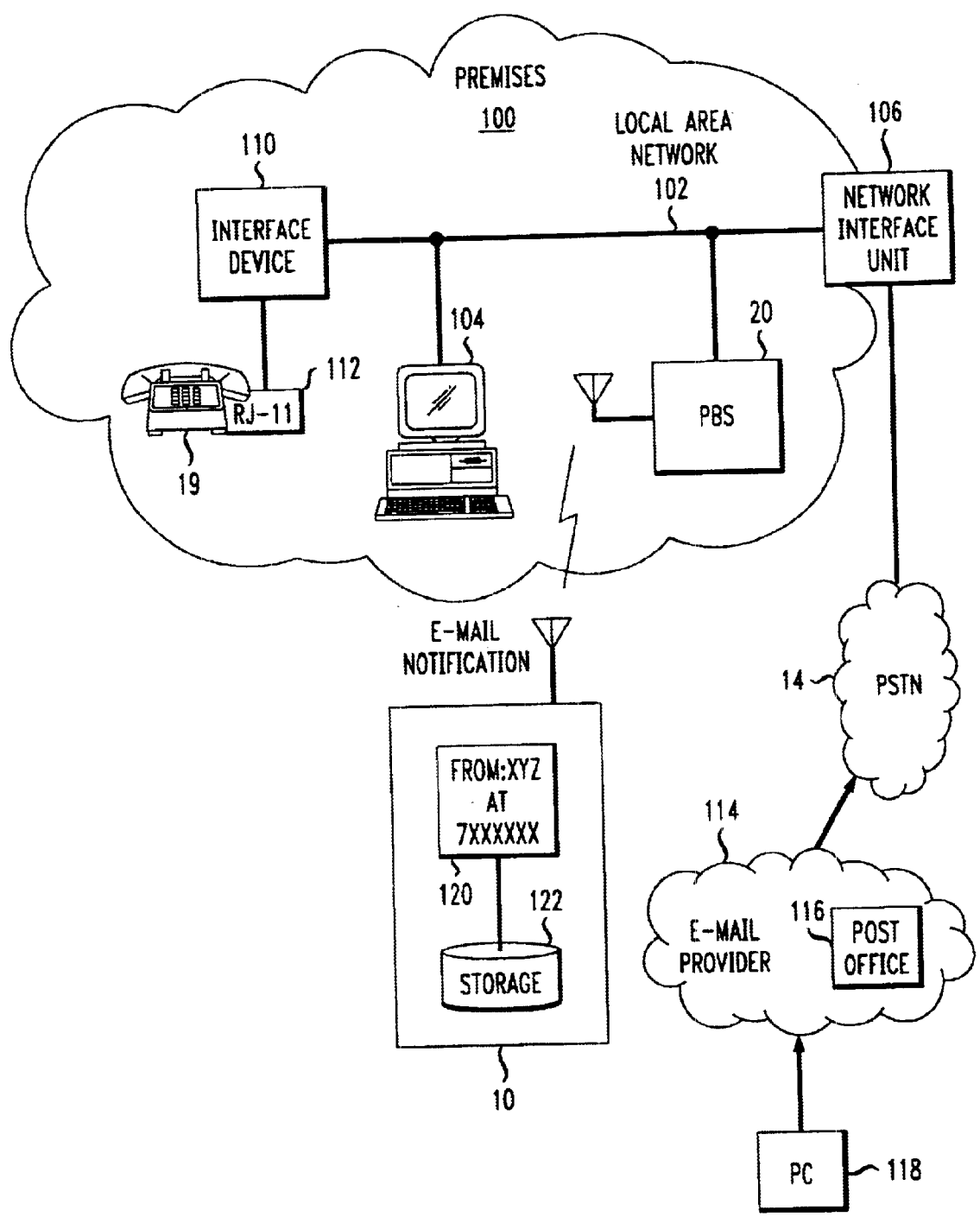
FIG. 2 shows a more detailed view of the premises based local area network.

As shown in FIGS. 1 and 2, the wireless communication network, in a form of the cellular communication network 9, communicates with a premises based local area network 102 via a private base station. The local area network 102 includes the private base station 20 and a personal computer 104. The standard telephone is connected by an RJ-11 connection 112 to an interface device 110 that allows the telephone to communicate in the public switched telephone network 14.

In one aspect of the present invention, an e-mail is delivered to the personal computer 104 of a subscriber of the e-mail service via the public switched telephone network 14 such as from a commercial e-mail provider 114, such as an internet provider or possibly other commercial services such as Prodigy, America On-Line and Compuserve, which has received the e-mail message from another computer 118. Of course, to receive the e-mail message, the personal computer 104 must be on and able to receive a notification. Unless the subscriber to that commercial service happens to be logged-on to the internet or in communication with the particular commercial service, there is no way that the subscriber knows that an e-mail message is waiting in a subscriber mailbox 116 of the commercial provider. Alternatively, if the message has been forwarded through the premises based local area network 102 to the personal computer 104, the subscriber must check the e-mail on his personal computer 104.

When the personal computer 104 receives an e-mail, it generates an e-mail notification, which the private base station 20 then receives and forwards either directly to a wireless device such as the cellular telephone 10 or into the wireless communication network, e.g., the cellular telephone network and then to the wireless device, in this instance a cellular telephone. Typically, the e-mail notification includes some identification of the e-mail sender such as the computer or telephone address and perhaps the name and other identification information if available.

The land premises based local area network 102 can operate at about 100–200 kilobytes per second. Those skilled in the art can choose the appropriate components for the various parts of the local area network.

Figure 3A:
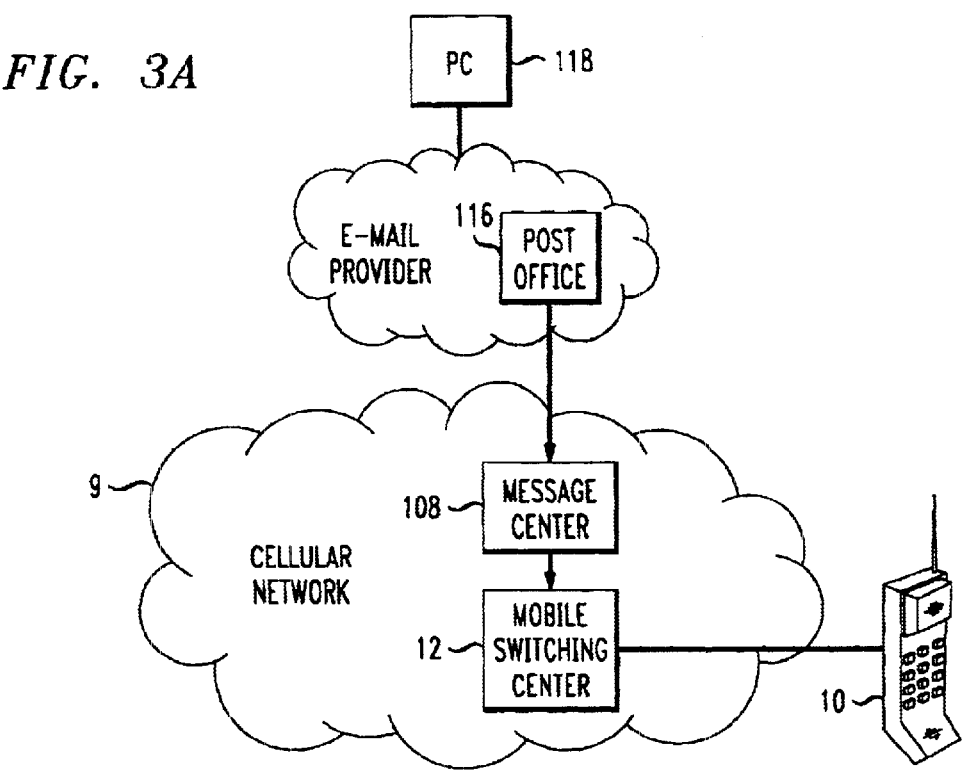
FIG. 3A is another view of an e-mail provider that generates an e-mail notification to a cellular network.

FIG. 3A illustrates another embodiment where a commercial provider forwards an e-mail notification directly to a messaging center 108. An e-mail provider such as America On-Line, Prodigy or Compuserve has a subscriber post office where e-mail messages are stored. The e-mail provider 114 receives an e-mail message from a source such as another personal computer 118 and stores the e-mail message in the subscriber mailbox 116. The e-mail provider 114 then forwards an e-mail notification into the cellular telephone network 9. The messaging center 108 receives the e-mail notification and forwards it to a mobile switching center 12, which in turn forwards the e-mail notification to a cellular telephone or other wireless device of the subscriber to notify the subscriber that an e-mail message is waiting.

In both embodiments above, the cellular phone (or other wireless device), would include a display 120 and small storage device 122 as shown in FIG. 2 where the different e-mail notifications can be stored and then displayed. If necessary, the different e-mail notifications could be scrolled and a telephone call made to an e-mail provider to obtain further information about the desired e-mail notifications. The message could possibly be retrieved in some instances by dialing the e-mail provider. In some instances, the e-mail notification could be transmitted over a digital control signal (channel). Also, an example of a cellular phone that could be used for the present invention includes an IS-136 cellular phone.

Figure 3B:
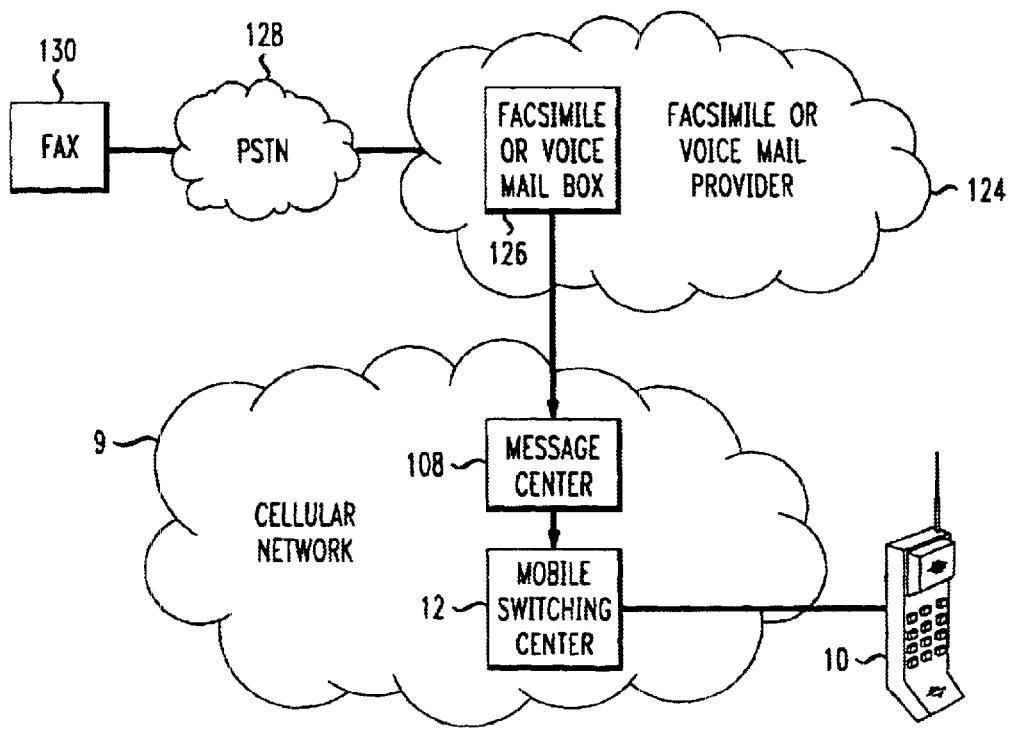
FIG. 3B is a view of a facsimile or voice-mail provider that generates a voice-mail notification to a cellular network.

FIG. 3B illustrates another embodiment where a facsimile or voice-mail provider forwards a facsimile or voice-mail notification directly to a messaging center 108. A facsimile or voice-mail provider has a subscriber mailbox where facsimile or voice-mail messages are stored. The voice-mail provider 124 receives a facsimile or voice-mail message and stores the message in the subscriber mailbox 126. The facsimile or voice-mail provider 124 then forwards a message notification into the cellular telephone network 9. The messaging center 108 receives the message notification and forwards it to a mobile switching center 12, which in turn forwards the message notification to a cellular telephone or other wireless device of the subscriber to notify the subscriber that a message is waiting.

Using, as an example, an IS-136 phone, one embodiment of the present invention provides message notification of stored facsimile and ability for a subscriber to have the stored facsimile forwarded to another location. In particular, when the facsimile provider 124 receives a facsimile, it is stored in a facsimile mail box 126. A message notification is provided to the subscriber, as described above for a voice-mail message. The subscriber may then contact the facsimile subscriber and arrange to have the facsimile forwarded via the PSTN 128 to another device 130. That other device might be the subscribers office facsimile machine, a third party facsimile machine, or the wireless device itself.

Figure 4:
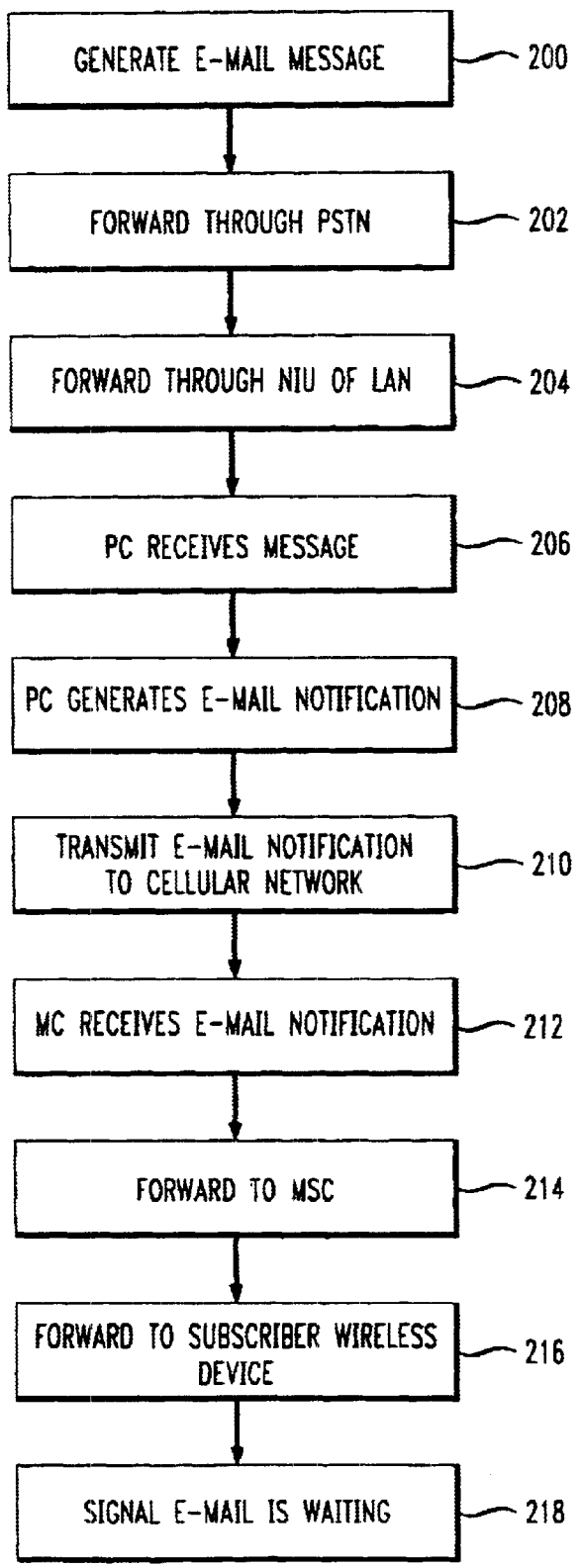
FIG. 4 shows a high level flow chart depicting one example of the invention in operation.

FIG. 4 illustrates a high level flow chart showing one method that could be used in the present invention. For purposes of clarity, block numbers begin with numerals starting in the 200 series. As illustrated, an e-mail message is first generated such as from a personal computer 118 (Block 200), sent to the e-mail provider 114 and forwarded through the public switched telephone network 14 (Block 202) into the network interface unit 106 of the premises based local area network 102 (Block 204). In this particular example, the personal computer 104 receives the e-mail message (Block 206). The personal computer 104 then generates an e-mail notification (Block 208) having the e-mail address and the party name if known. The private base station 20 then transmit the e-mail notification into the cellular phone network (Block 210). The messaging center 108 of the cellular telephone network receives the e-mail notification (lock 212) and forwards it to the mobile switching center (Block 214). The mobile switching center then forwards the e-mail notification to the subscriber wireless device (Block 216), which signals that an e-mail is waiting (Block 218) such as by display.

There now follows for purposes of clarity only, a description of a private base station that could be used with the present invention.

Referring again to FIG. 1, the private base station 20 is limited to a very low level of transmitted power to restrict coverage to a relative small area. This allows the private base station to reuse the same radio frequency spectrum used by the macro cellular systems as long as the frequency of use selected by the private base station is different from the cell for the regular public or macro cellular system in whose area of coverage the private base station is located. The operating frequency spectrum for the private base station is selected in a way that insures no interference to the macro cellular system. This is achieved by directing the private base station to perform channel scanning and interference measurements before selecting its operating frequencies. While operating in its normal mode awaiting receipt of an incoming call or an off-hook request from a registered mobile station, the private base station 20 continually broadcasts digital control channel information containing its identity and system parameters.

An IS-136 compliant mobile station can search for a private base station's control channel transmission using a number of techniques. One of these may be based on the mobile station's prior knowledge of the private base station's existence. Another may be in response to a mobile station user manually directing the mobile station to search for the private base station. In yet another technique the mobile station, upon finding the control channel of the private base station, automatically goes through a series of controlled procedures to obtain registration with the private base station.

Once a mobile station, for example, station 10, obtains a successful registration with the private base station 20, the private base station 20 makes a modem connection to the private base station visiting location register 30 to update the mobile station's temporary line dialing number (TLDN). The temporary line dialing number in this case will be the private base station's land-line number (LLN). Hence, when an incoming call is directed to a particular mobile station 10, information including the temporary line dialing number for this mobile station is accessed from the private base station visiting locating register 30 through the home location register 15 or the visiting location register 16 and the call routed to the private base station's LLN. It is also understood that the temporary line dialing number may be stored in either the home location register 15 or the visiting location register 16, and the mobile switching center 12 then accesses this TLDN from this register. The private base station 20 detects the ring for an incoming call and sends an alerting signal or page to the registered mobile station. Following the mobile station's response to the alerting signal, private base station 20 establishes a traffic channel for the mobile station and generates an off-hook condition to connect the incoming call through the private base station to the mobile station.

The private base station 20 supports the registering of multiple mobile stations and, provides a personalized call delivery feature for each registered mobile station. In order to provide the personalized call delivery feature, during the TLDN update for the mobile station at the private base station visiting location register 30, additional information elements, i.e., digits, are added to the TLDN update for distinguishing a particular mobile station with the private base station 20. During the registration of a mobile station with the private base station, a local unique address is generated at the private base station. This local unique address may be either advantageously generated from the mobile station identification number contained in each mobile station or generated from an ordered position assigned by the private base station for each portable station registered with the private base station.

Thus by way of illustrative example of the operation of the ordered position registration, the mobile station that registers with the private base station 20 is inserted in registered position 1 by the private base station visiting location register 30, and the second mobile station is inserted in registered position 2 by the private base station visiting location register 30 and so forth. This ordered position information is advantageously treated as the local unique address or a sub-address by the private base station 20 for each mobile station registered with it. A distinct identity of binary digits for each mobile station distinguishing it from all other mobile stations registered with private base station 20 is obtained thereby.

The private base station receives the binary digits describing the order of registered position in the same manner as caller-ID delivery is achieved. The ordered position information is appended to the caller-ID message that accompanies an incoming ring signal or is appended to the time slot allocated for the caller-ID message when such message is not present. By way of example, switching offices that provide caller ID messages to a telephone station capable of decoding and storing the incoming telephone number are either shown or described in U.S. Pat. No. 4,277,649 which issued to D. Sheinbein on Jul. 7, 1981.

Knowing the order of registered position, the private base station along with the help of a mobile station user's profile stored in the private base station can support additional features like 1. Caller name display on the phone;
2. distinctive alerting;
3. Call blocking;
4. Incoming call log; and
4. Telephone answering device/message support.

Figure 5:
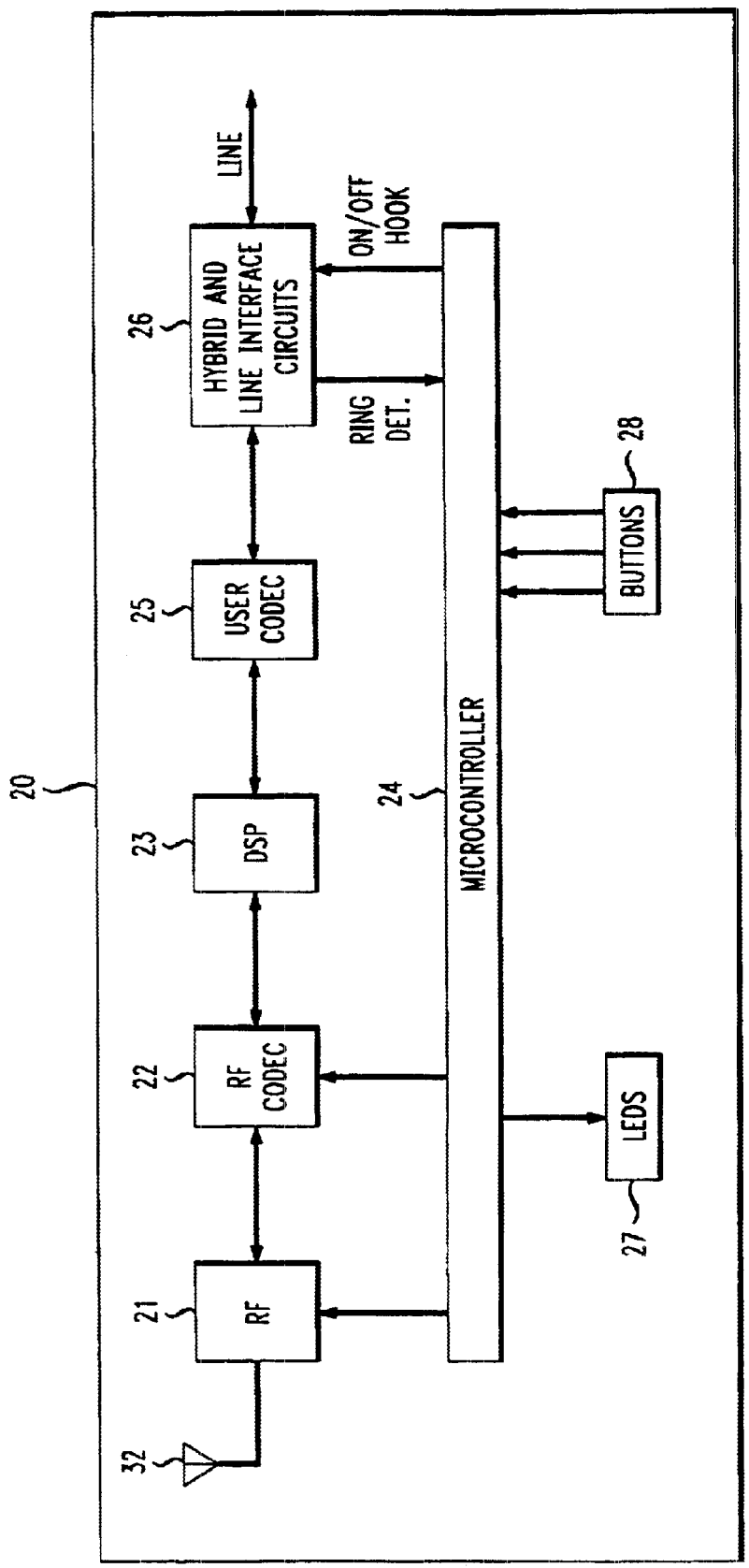
FIG. 5 shows a high level block diagram of a private base station separated into identifiable circuit sections.

Shown in FIG. 5 is a high-level block diagram of private base station 20 separated into identifiable circuit sections. A radio frequency (RF) circuit 21 performs the radio frequency signal processing. Included in this circuit is a radio frequency receiver section which receives the radio frequency signal from mobile stations and, after appropriate filtering and down conversion, produces I and Q signal for an RF CODEC 22 which is connected to the RF circuit 21. A radio frequency transmit section in RF circuit receives the I and Q signals from the RF CODEC 22, converts these signals to the appropriate radio frequency range and amplifies them for wireless transmission via antenna 32.

The RF CODEC 22 performs analog-to-digital (A/D) conversion of the I and Q signals received in the receiver section of the RF circuit 21 and digital-to-analog (D/A) conversion of the I and Q signals provided to the transmitter section of the RF circuit 21. The RF CODEC 22 also performs modulation for the transmission path.

Connected to the RF CODEC 22 is a digital signal processor (DSP) 23 which performs all the baseband signal processing for the private base station applications. This involves speech encoding/decoding, time-division-multiple-access framing/deframing, channel encoding/decoding, and other modem functions such as, for example, automatic gain control, symbol timing recovery, synchronization, and the like. A user CODEC 25 performs conversion of digitally sampled speech signals to analog speech signals and also performs conversion of analog speech signals to digitally sampled speech signals.

Figure 6:
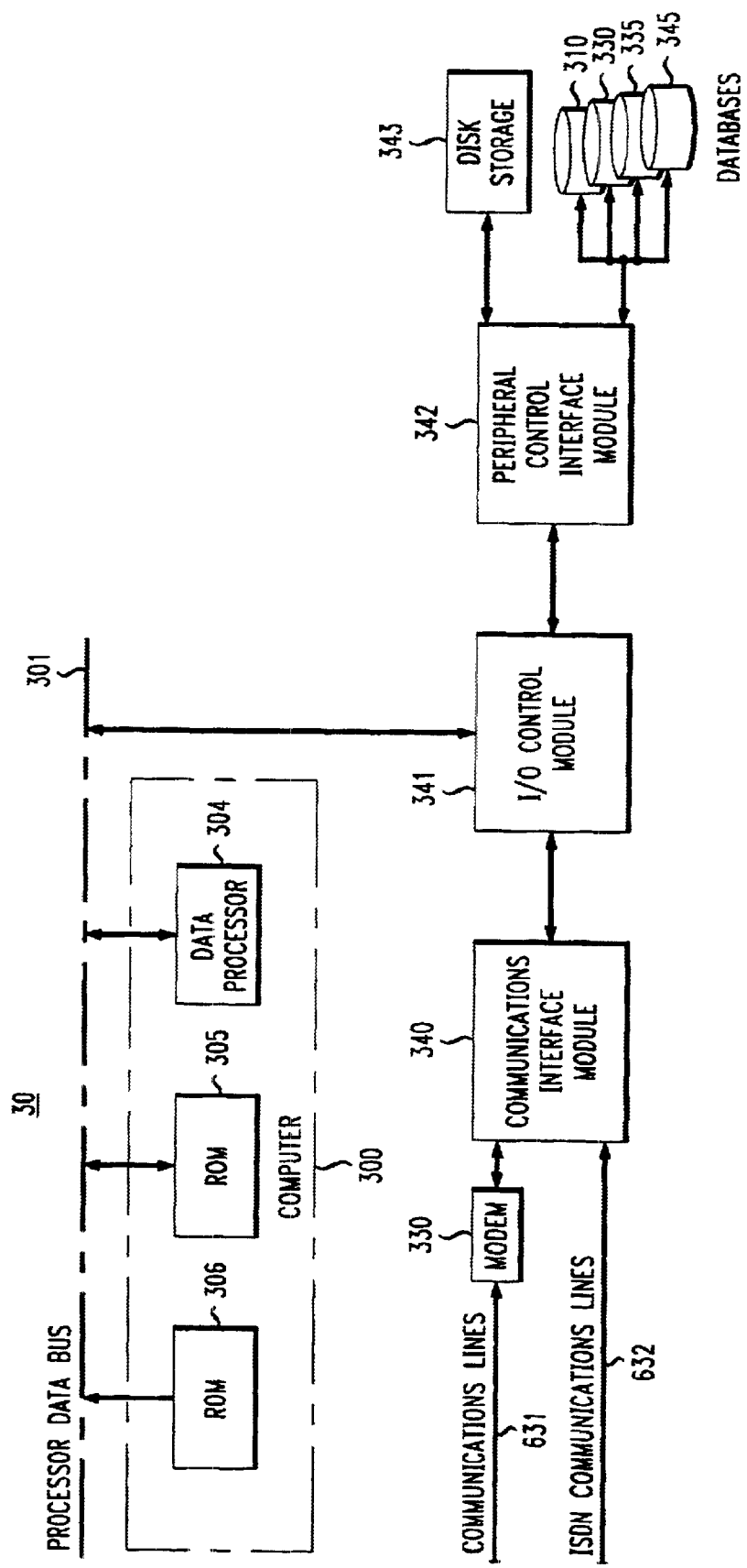
FIG. 6 shows a high level block diagram of a private base station visiting location register separated into identifiable circuit sections.

Referring now to FIG. 6 of the drawings, there is shown a general block diagram of a private base station visiting location register 30. This private base station visiting location register 30 may be geographically located away from or co-located with either a visiting location register or a home location register, with which it receives and provides private base station information. Moreover, the functions provided by the private base station visiting location register 30 also may be integrated into a visiting location register or a home location register, and such operation is hereby anticipated. The elements employed in the private base station register are computer 300, modem 330, control interface modules 340, 341 and 342, disk storage unit 343 and a plurality of databases 310, 330, 335 and 340.

The input to the private base station register 30 from a private base station, such as private base station (20 in FIG. 1), is provided over two-way communications lines 631 to the modem 330. The communications modem 330 may be a modem pool and typically provides data communication between multiple private base stations and the private base station visiting location register through the public telephone switched network. In providing this communication, any number of well known protocols that exists in the industry today may be used. By way of example, modem protocols such as V.22, V.22 bis or Bell 212 are all suitable for communications between the modem 330 and a private base station through the public telephone switched network. It is also possible to have a packet data protocol provide the two-way communications requirement. For example, an X.25 packet data protocol may be used in providing this communication.

Also connected to the communications interface module 340 are integrated services digital network (ISDN) communications lines 632. Although ISDN are shown, other lines may suitably be used in providing this communication, as well. The ISDN lines 632 are connected directly to the communications interface module 340 and enable the private base station visiting location register 30 to maintain communications between the home location register (15 in FIG. 1) and the visiting location register (16 in FIG. 1). Protocols that may be used in providing this ISDN communication may be, by way of example, either IS-41 or SS7 which are well-known in the industry.

The data signals received by modem 330 over both communications lines 631 and 632 are provided to a communications interface module 340. The data received by the interface module 340 is couple to the input/output control module 341 for processing by the computer 300 or for input to or accessing one or more of a series of databases, illustratively shown as database 310, 330, 335 and 345, as well as a disk storage medium 343, via the peripheral control interface module 342. The peripheral control interface module 342 interfaces the computer 300 and communications lines to the appropriate ones of the series of databases, or data files in accordance with the service or task being performed.

Each one of the series of databases 310, 330, 335 and 345 may contain specific information. For example, the database 310 may contain information of frequency allocations of surrounding cellular systems. Database 330 may contain information of private base stations operating parameters determined by the private base station's location. Examples of a private base station operating parameters are its operating frequency, transmitted power, authorization time, and the like. Database 335 may contain mobile station order of registered position information with the private base station and also private base station profiles. Examples of private base station profiles are "Call Waiting" and "Caller ID" that are provided by the public telephone switched network, and also any private base station location register 30. It is to be understood that other databases providing additional services or tasks also may be interfaced with the computer 300 via the peripheral control interface module 342.

Disk storage 343 may contain operational information that is applicable to the cellular system in general, such as operation parameters that are required for interfacing the private base station visiting location register with home location register and visiting location register.

Contained in the computer 300 are a data processor 304, random access memory (RAM) 305 and read only memory (ROM) 306. This processor 304 responds to data input into input/output control mode 341. And with input from random access memory 305 and read only memory 306, processor 304 also provides the data to the processor bus 301 for facilitating data exchanges between the plurality of databases and the communications interface module 340 via the peripheral control interface module 342.

Figure 7:
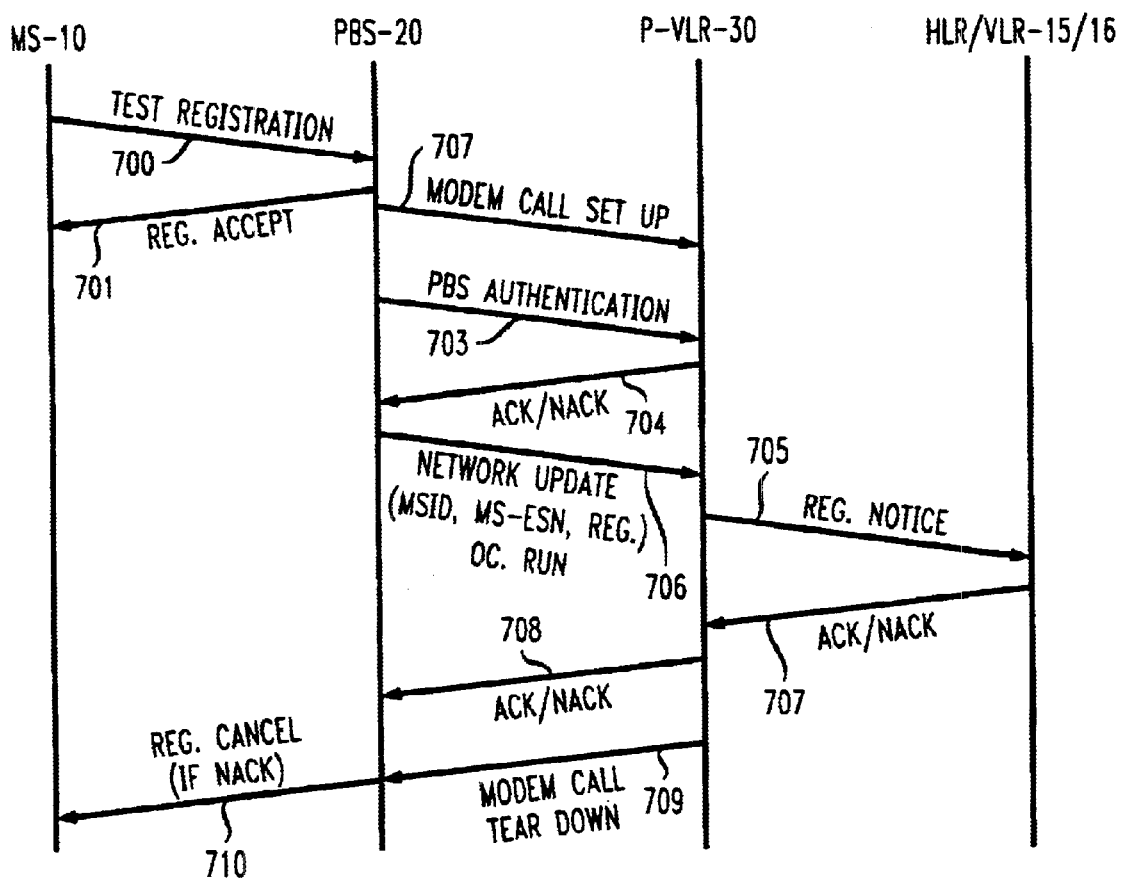
FIG. 7 shows a registration/network update process through which a mobile station gains access to a private base station.

Referring next to FIG. 7, there is shown a registration/network update process though which a mobile station, such as mobile station (10 in FIG. 1), gains access to a private base station, such as private base station (20 in FIG. 1). The private base station initially authorizes the mobile station to obtain registration 701 through it. After such initial authorization, the mobile station remains on the digital control channel. The private base station then seeks authorization 703 for registration of the mobile station from the private base station visiting location register. The camping of the mobile station on the digital control channel can be terminated by the host private base station if proper authorization from the private base station visiting location is not obtained. During the registration process, the home location register (15 in FIG. 1) or visiting location register (16 in FIG. 1) is provided a call forwarding number 705 from the private base station visiting location register (the private base station's LLN) for the mobile station.

There are two kinds of registration processes that take place between the mobile station and the private base station. One is the initial registration of the mobile station with the private base station. In this case, the private base station has no prior knowledge of the mobile station and will not accept its attempt to register unless the primary user of the private base station directs the private base station to do so. This acceptance process can be accomplished by the primary user pressing a registration button on the base station and then to prevent fraudulent registration, for example, entering a coded sequence of digits which only he or she knows. Once a mobile station obtains initial registration, it can automatically obtain subsequent registration with the private base station upon its arrival within the private base station's coverage area. Thus, this subsequent registration does not require intervention of the primary user of the private base station in any manner.

The registration process begins when an authorized mobile station sends a test registration (registration sequence) 700 to the private base station. This registration/network update process is summarized below and also illustrated in FIG. 7.

1. The mobile station sends a test registration 700 which includes the mobile station's identification (mobile station ID) and the mobile station's electronic serial number (ESN) to the private base station.

2. The private base station sends back a registration accept signal 701 to the mobile station.

3. The private base station establishes a modem call 702 to the P-VLR.

4. The private base station performs an authentication task 703 to satisfy P-VLR's requirements.

5. The P-VLR sends and acknowledge or negative acknowledge (ACK/NACK) 704 to the private base station in response.

6. Receipt of the NACK response cancels further transaction by the private base station and the mobile station registration attempt will be canceled. Depending on the situation, the private base station may also be directed to shut down and retry registration at some subsequent time.

7. Following receipt of an ACK, the private base station performs a network update 706 when the mobile station ID, mobile station ESN, land-line number as well as the order of registered position obtained for the mobile station are sent to the P-VLR. The order of registered position uniquely identifies the mobile station among other currently registered mobile stations within the private base station.

8. The P-VLR sends a Registration Notification 705 to either the HLR or VLR. If the mobile station is in its home cellular coverage area, the notification will be directed to the HLR. Otherwise, the VLR will receive the notification. In the later case the HLR for the mobile station's home area will also be notified of the registration notification.

9. The HLR or VLR sends an ACK or NACK 707 to the P-VLR. If an NACK is send, the denial could depend on a number of factors that depend on the service provider. For example, the provider may find that the mobile station does not have a valid service with it, or a second example could be that the mobile station does not have a valid mobile ID number, or it could be any other similar reason.

10. The P-VLR sends corresponding ACK or NACK 708 to the private base station.

11. After receipt by the private base station of the ACK or the NACK, the modem call is terminated 709.

12. If an NACK is sent to the private base station by the P-VLR, the private base station sends a registration cancellation 710 to the mobile station.

The first mobile station registered with the private base station in this process is allocated the position location number 1. The subsequent mobile stations registered with the private base station are given correspondingly increasing numbers. A private base station are given correspondingly increasing numbers. A private base station can typically support, by way of example, 10 such registrations, although more or less may be desired and the private base station suitably configured to accommodate different numbers. If a new mobile station registration request is properly received which exceeds the number then allocated for supporting registered mobile stations, the least used mobile registration number will be vacated to make room for the new one. Once registered, the mobile station does not need to re-register in this particular sense. Whenever the mobile station attempts to obtain subsequent registration for service with the private base station, the registration location number for the mobile station remains unchanged, assuming some minimal level of periodic use. During the process of subsequent service provision, the private base station always sends to the private base station visiting location register 30 the same registration location number for a particular mobile station. Also, it is understandable that the information exchange for a new mobile station registration will be much extensive when compared to its subsequent registration with the private base station.

Figure 8:
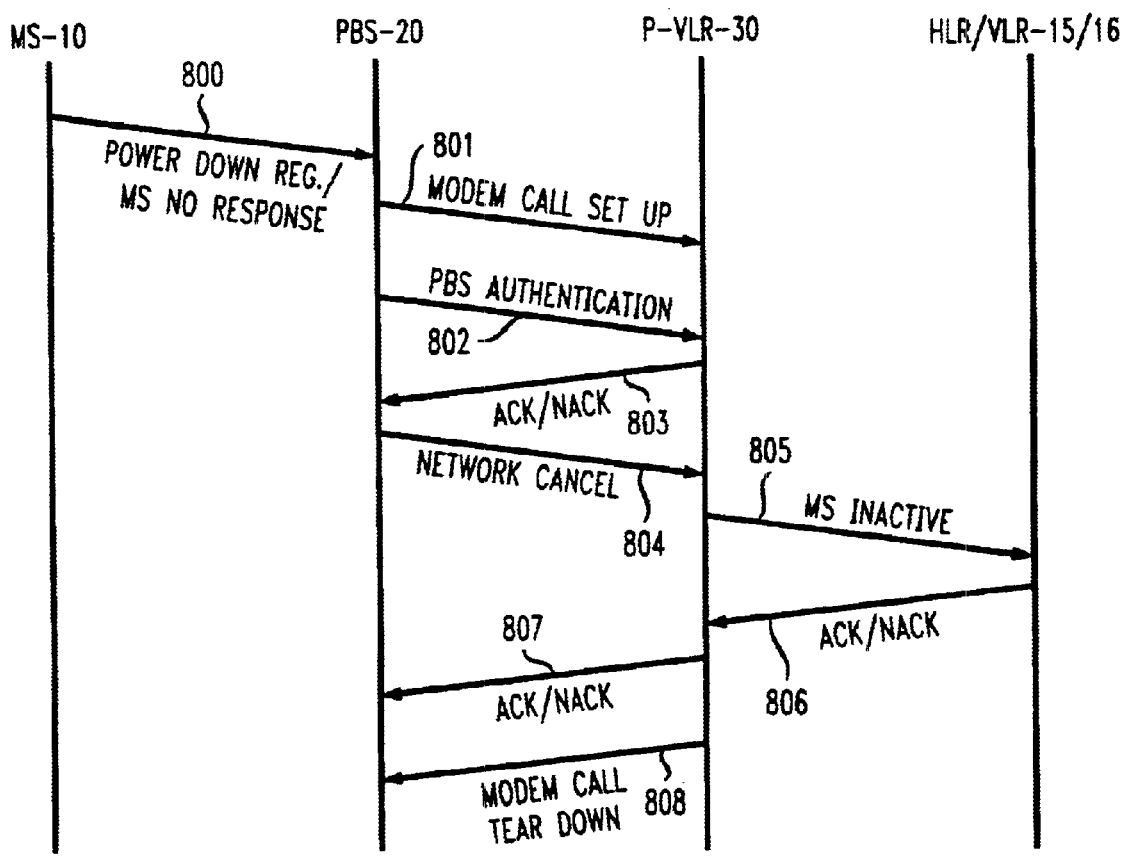
FIG. 8 shows a network cancellation process which details how a registration of a mobile station with a private base station is canceled.

Referring now to FIG. 8, there is shown a network cancellation process in which a pre-established and existing registration of a mobile station with a private base station is canceled or terminated. The network cancellation process begins when an authorized mobile station moves out of the private base station's coverage area or the mobile station's power is turned off. When the mobile station moves out of the coverage area of the private base station, the resulting loss of communication from the mobile station is detected by the private base station. Also, when the mobile station's power is turned off, the mobile station performs power-down registration. When either of these two events occurs, the network cancellation process is executed by the private base station. Through this process, any call forwarding to the private base station's land-line number for the mobile station is cancelled. This network cancellation process is summarized below and also illustrated in FIG. 8.

1. The mobile station performs power-down registration 800.
2. The private base station establishes a modem call to the P-VLR 801.
3. The private base station performs an authentication task to satisfy the P-VLR's requirements 802.
4. The P-VLR sends either an ACK or a NACK in response 803.
5. If the NACK response is received, the private base station cancels further transactions for this particular mobile station. The private base station also may be directed to shut down or to attempt a retry later at authentication.
6. If an ACK response is received, the private base station performs network cancellation 804 by sending the mobile station ID and the mobile station ESN to cancel call forwarding of telephone calls to the mobile station which has either moved out of the coverage area or whose power is turned off.
7. The P-VLR sends a mobile station inactive signal 805 to HLR/VLR.
8. The HLR/VLR then sends either an ACK or a NACK 806 to the P-VLR.
9. The P-VLR sends a corresponding ACK or NACK 807 to the private base station.
10. Followed by the sending of the ACK or NACK to the private base station, if the modem call is terminated 808.

The user of a mobile station may elect to terminate communication with a private base station and reenter his or her mobile station into the cellular system. A mobile station may exercise this option, when, for example, service at the private base station is not available due to the single land-line connection to the public telephone switched network being occupied by another mobile station communicating through the shared private base station.

Referring to FIG. 1, a mobile station user may reenter the cellular system simply by, for example, pressing a cellular service button which executes a process wherein service with the private base station is terminated and service with the cellular service provider in the public cellular system is established. Once cellular service is established with, for example, cellular base station 13, a network update is performed by home location register 15 is the mobile station is located in its home coverage area or by visiting location register 16 if the mobile station is outside its home coverage area. Next, either home location register 15 or visiting location register 16 informs private base station visiting location register 30 that the identified mobile station has returned to the cellular system. The private base station visiting location register 30 then stores a mobile station inactive signal for the identified mobile station effectively inactivating or cancelling its call forwarding information.

Once the land-line between the private base station 20 and the public telephone switched network 14 becomes available, the network cancellation process illustrated in FIG. 8 is attempted by the private base station. Since call forwarding for the identified mobile station has already been cancelled in the private base station visiting location register 30, by the mobile station reentering the cellular system, executing this process confirms that the mobile station is presently not active with the private base station 20.

Figure 9:
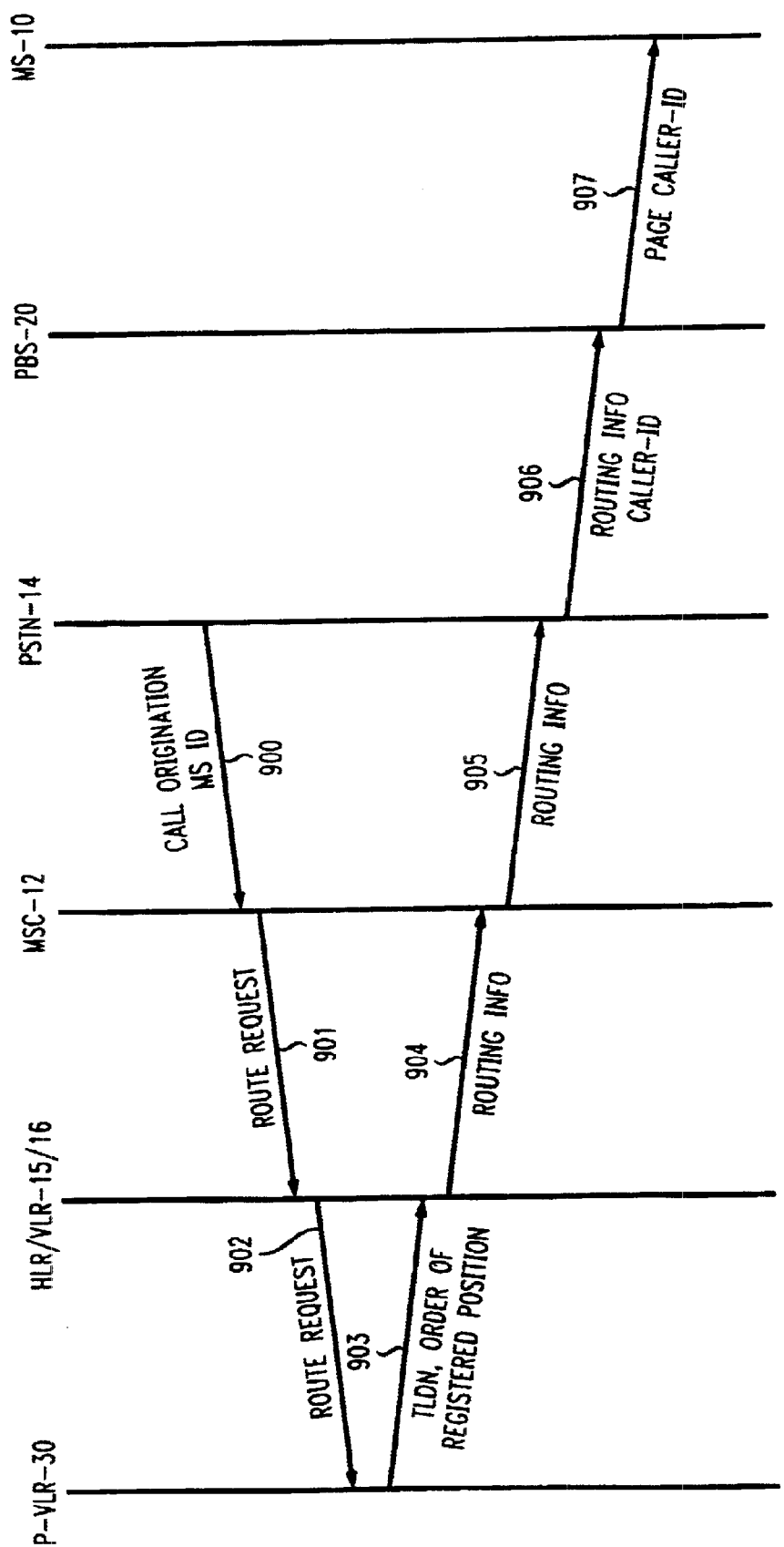
FIG. 9 shows a network process which provides an incoming call transaction flow for a mobile station with a private base station.

Referring next to FIG. 9, there is shown a network process which provides an incoming call transaction flow for a mobile station registered with a private base station. All incoming calls for each one of the mobile stations registered with the private base station will be routed to the private base station's land-line number. The call transaction flow is summarized below and with reference to FIG. 9.

1. A call origination and the dialed mobile station ID are received from the public switched telephone network and routed to the MSC 900. Alternatively, the MSC may receive the call origination and the dialed mobile station ID from the cellular base station 13 in the public cellular system.
2. The MSC sends a route request 901 to the mobile station's HLR (or to the VLR when the mobile station is a visiting station).
3. The HLR forwards 902 the Route Request to the corresponding P-VLR which contains the registration information for the mobile station.
4. The P-VLR, returns the TLDN as well as the order of registered position 903 to the HLR (or to the VLR when the mobile station is a visiting station) as part of the routing information. In this case, the order of registered position is defined as a sub-address for the mobile station.
5. The HLR adds mobile station ID and mobile station ESN to the routing information and returns 904 the location request to the MSC which, in turn, forwards this information 905 to the PSTN.
6. The call is delivered by the PSTN, which may include caller ID, to the LLN, the sub-address containing order of registered position is also sent along with the caller ID 906 to the private base station. The private base station then sends a page 907 to the mobile station along with the caller ID. The paged mobile station is the one which corresponds to the order of registered position.

Based on obtaining an order of registered position for each of the mobile stations, the private base station is able to advantageously offer various intelligent features which are personalized according to customer needs. For example, a calling party may have his or her name displayed on the mobile station for the convenient of the user at the mobile station.

The user of a registered mobile station is provided with a separate memory space allocated at the private base station to store a directory of phone numbers with names respectively associated with the telephone numbers. Upon receiving an incoming call for a particular mobile station (distinguished by the order of registered position), a calling party having a number that matches with one of the stored numbers in the directory will have his or her name sent to the mobile station by the private base station for display instead of the telephone phone number.

The private base station is able to provide distinctive alerting for a registered mobile station. The user of a registered mobile station can have, for example, a distinctive ringing sound (chosen from a group of ring sounds) associated with a particular calling party stored in his or her directory. Distinctive ringing is illustratively described in U.S. Pat. No. 4,995,075, issued to Angiolillo-Bent et al. When an incoming call is from the particular calling party, the private base station is able alert the mobile station using the distinct ringing sound.

The private base station is also able to provide a number of other advantageous functions based on obtaining an order of registered position for each of mobile stations. Features such as call blocking, an incoming call log, such as described in U.S. Pat. No. 5,386,460, issued to Boakes et al. and a telephone answering function with personalized mailboxes are easily provided. For call blocking, the user has a choice of blocking an incoming call which number matches one of specified numbers stored in the directory. The incoming call log is advantageously provided in the private base station for each of the registered mobile station users. And the private base station allows personalized greetings to be stored in a mailbox for each of the registered mobile stations. When an incoming call is directed to a particular mobile station and the user of this station does not respond, this personalized greeting is played to the calling party by the private base station.

The advantages and beneficial features of the present invention now allow voice-mail and e-mail messages to be delivered or stored within a subscriber mail box such as within a commercial e-mail provider or a voice-mail provider in a premises based local area network personal computer while allowing notification to a mobile customer who is a subscriber to the system. The personal computer on the premises based local area network can generate the voice-mail or e-mail notification having message identity information to a premises based private base station. Alternatively, the voice-mail or e-mail provider can transmit directly into a wireless communication network such as the cellular telephone network. With the present invention, a subscriber can know if a voice-mail or e-mail message is waiting in the subscriber mailbox and make appropriate arrangements to retrieve the stored message.

What has been described is merely illustrative of the present invention. Other applications to wireless telephones, computers or other communication systems other than the disclosed system are contemplated as being within the knowledge of one skilled in the art and may be utilized without departing from the spirit and scope of the present invention.

That which is claimed is:

1. A method for notifying a subscriber having a wireless device comprising:
receiving within a wireless communication network a message notification from a private base station connected to a premises based local area network, said local area network having received said message notification from a personal computer, said personal computer having received a message from a message provider, said message notification including information related to said message, but not including the content of said message in the notification.

2. The method of claim 1, wherein said message is an e-mail message.

3. The method of claim 1, wherein said message is a voice-mail message.

4. The method of claim 1, wherein said message is a facsimile message.

5. The method of claim 1, further comprising:
receiving said message notification within said wireless communication network; and
forwarding said message notification to said wireless device of the subscriber.

6. The method of claim 5, further comprising:
storing said message notification within said wireless communication network if the subscriber does not receive said message notification so as to attempt delivery at a later time.

7. The method of claim 1, wherein said wireless communication network further comprises a cellular telephone network.

8. The method of claim 1, wherein said wireless device further comprises a cellular telephone.

9. The method of claim 1, wherein said wireless device further comprises a cordless telephone.

10. The method of claim 1, wherein said wireless device further comprises a wireless pager.

11. The method of claim 1, further comprising:
receiving message information with said message notification; and
displaying said message information on a display of said wireless device.

12. The method of claim 11, wherein the message information further comprises:
message identity and source.

13. The method of claim 1, further comprising:
displaying said message notification on a display of said wireless device.

14. The method of claim 1, wherein said message comprises a facsimile message, and further comprising the step of:
forwarding said facsimile message to another device.

15. The method of claim 14, wherein said another device is a facsimile machine.

16. The method of claim 14, wherein said another device is said wireless device.

17. A system for delivering a message notification to a subscriber having a wireless device comprising:
a premises based local area network and including in communication therewith:
a personal computer to which a message is delivered from a message provider, and
a private base station for receiving a message notification from said personal computer, the message notification including information related to the message, but not including the content of the message in the notification, and
a wireless communication network in communication with said premises based local area network for receiving said message notification from said private base station and forwarding said message notification to a wireless device of a subscriber to indicate that the message is waiting.

18. The system of claim 17, wherein the message is an e-mail message.

19. The system of claim 17, wherein the message is a voice-mail message.

20. The system of claim 17, wherein the message is a facsimile message.

21. The system of claim 17, wherein the premises based local area network further comprises:

a network interface unit for interfacing with a telephone network and receiving messages from the telephone network for delivery over the local area network to the personal computer.

22. The system of claim 17, wherein the wireless communication network further comprises:

a cellular telephone network and said private base station is in communication with said cellular telephone network and forwards said message notification into said cellular telephone network for delivery to a mobile device.

23. The system of claim 17, wherein said wireless device further comprises a cellular telephone.

24. The system of claim 17, wherein said wireless device further comprises a cordless telephone.

25. The system of claim 17, wherein said wireless device further comprises a wireless pager.

26. The system of claim 17, wherein said private base station transmits said message notification over a digital control signal.

27. The system of claim 17, further comprising:

a premises based telephone; and a network interface device connecting the premises based telephone to the local area network.

28. The system of claim 17, wherein said message comprises a facsimile message, and further comprising:

forwarding said facsimile message to another device.

29. The system of claim 28, wherein said another device is a facsimile machine.

30. The system of claim 28, wherein said another device is said wireless device.

* * * * *